INVENTOR:
ROBERT L. BUTTON

INVENTOR:
ROBERT L. BUTTON
BY
ATTORNEYS

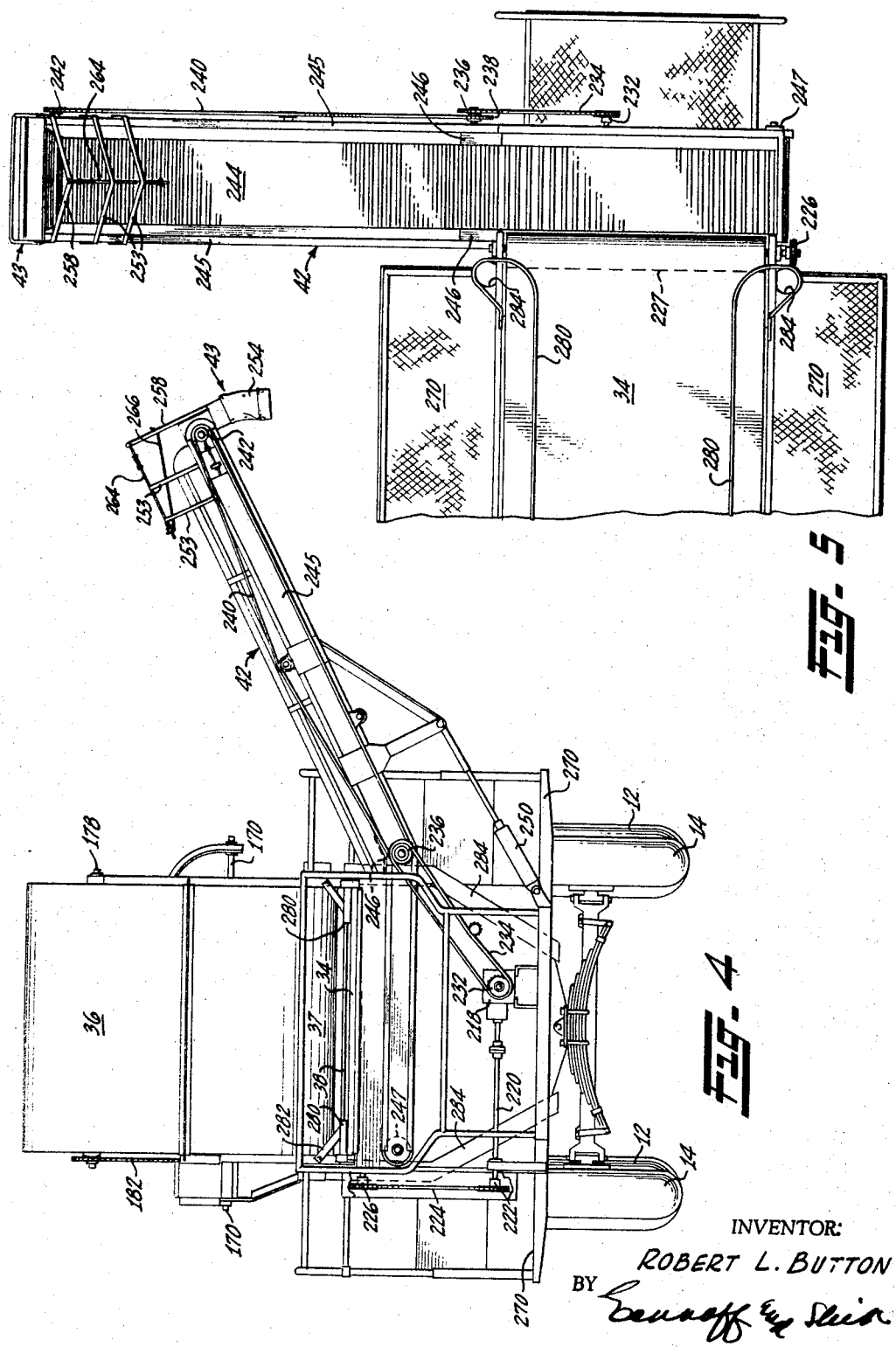

April 8, 1969     R. L. BUTTON     3,437,151
TOMATO HARVESTER
Original Filed Dec. 18, 1961     Sheet 5 of 5
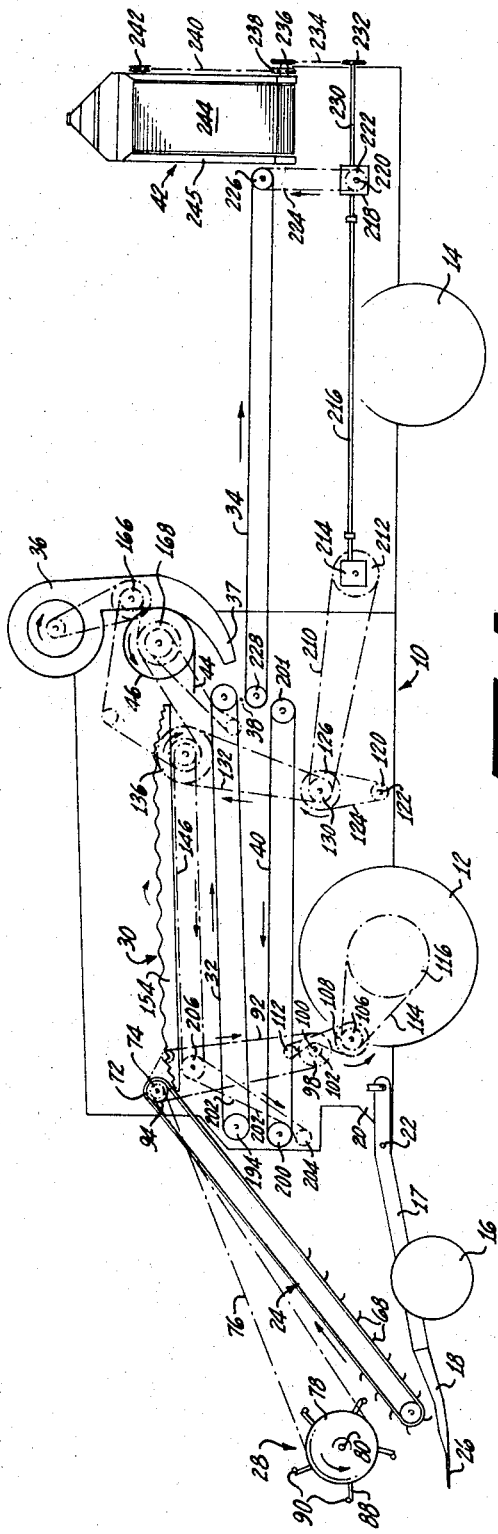
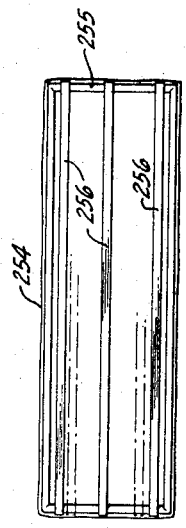
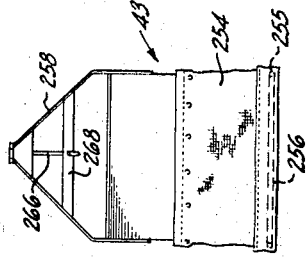
INVENTOR:
ROBERT L. BUTTON
BY
ATTORNEYS

United States Patent Office 3,437,151
Patented Apr. 8, 1969

3,437,151
TOMATO HARVESTER
Robert Leslie Button, Rte. 1, Box 205,
Winters, Calif. 95694
Original application Dec. 18, 1961, Ser. No. 160,089, now Patent No. 3,193,020, dated July 6, 1965. Divided and this application Mar. 11, 1964, Ser. No. 351,591
Int. Cl. A01d 13/00, 15/00, 23/00
U.S. Cl. 171—17                                    2 Claims This is a division of application Ser. No. 160,089 filed Dec. 18, 1961, now Patent No. 3,193,020.

This invention relates in general to a machine for harvesting comestibles, especially tomatoes.

It is an object of this invention to provide a machine for harvesting comestibles, especially tomatoes by severing the entire plant from the roots, separating the fruit from the plants in a manner which does not involve damage to the fruit, separating the dirt, leaves, etc., from the fruit and thereafter presenting the fruit for sorting so that the culls may be discarded.

Further objects and advantages of this invention, if not specifically set forth, will become apparent during the course of the description which follows:

In the drawings:

FIGURE 4 is an enlarged end elevation from the left of FIGURE 1;

FIGURE 5 is a fragmentary plan view of the left end of the structure of FIGURE 1, FIGURE 5 completing the structure partially shown in FIGURE 3;

FIGURE 6 is an enlarged detailed view of the steel and canvas nozzle through which the fruit is discharged into containers therefor;

FIGURE 7 is an enlarged view looking upwardly into the mouth of the structure of FIGURE 6; and FIGURE 8 is a schematic representation of the overall structure showing the manner in which the various conveyors and other essential elements interact with one another.

Generally, this invention comprises a mobile harvester particularly suited for use in the harvesting of tomatoes wherein a knife assembly is pivoted at the forwardmost end thereof. Gauge wheels control the elevation of and support both the knife assembly and a conveyor operatively associated with the knife. The knife severs the tomato plants beneath the soil surface and the severed plants are placed on an ascending conveyor from which they are readily disengaged when they reach apparatus for separating the fruit from the plants. Leaves and other debre together with a certain amount of soil accompany the separated fruit to a point at which there is placed a blower which is so oriented as to drive such dirt, leaves, etc. from the conveyor bearing such fruit. A blast of air is directed opposite to the direction or movement to the conveyor supporting the tomatoes and hence results are obtained which are superior (for reasons which will be detailed below) to those possible heretofore where the blowers used for separating dirt and leaves have been oriented to blow at 90° to the direction of the conveyor. The tomatoes are then advanced to an inspection station where the culls may be removed.

Figure 1:
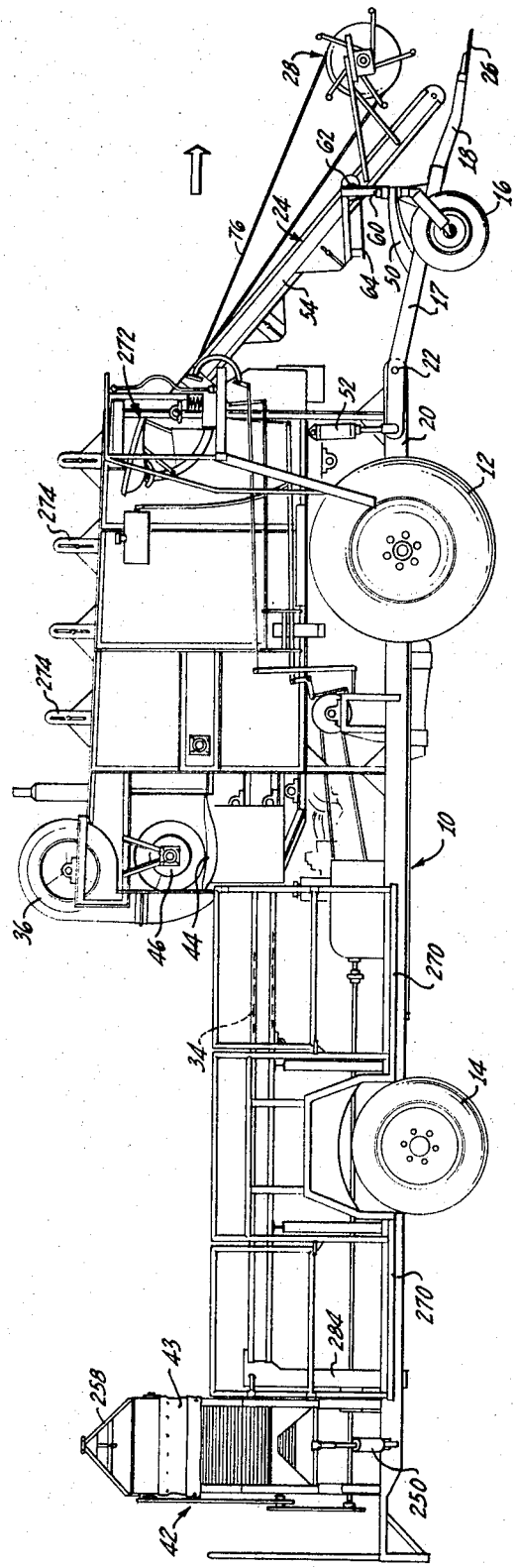
FIGURE 1 is a side elevation of the harvester of this invention.
Figure 2:
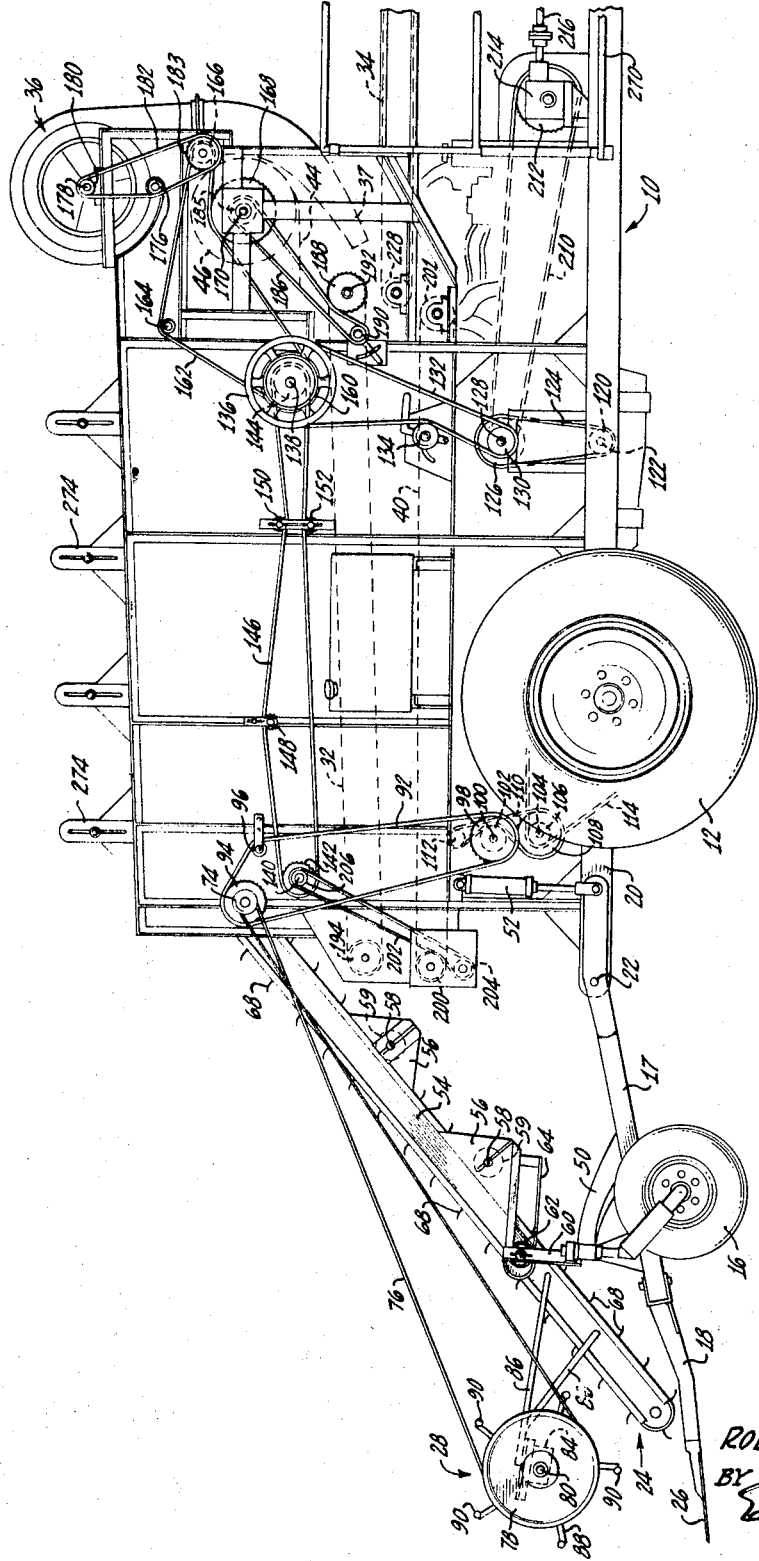
FIGURE 2 is an enlarged fragmentary side elevation showing portions of the opposite side of the structure of FIGURE 1.
Figure 3:
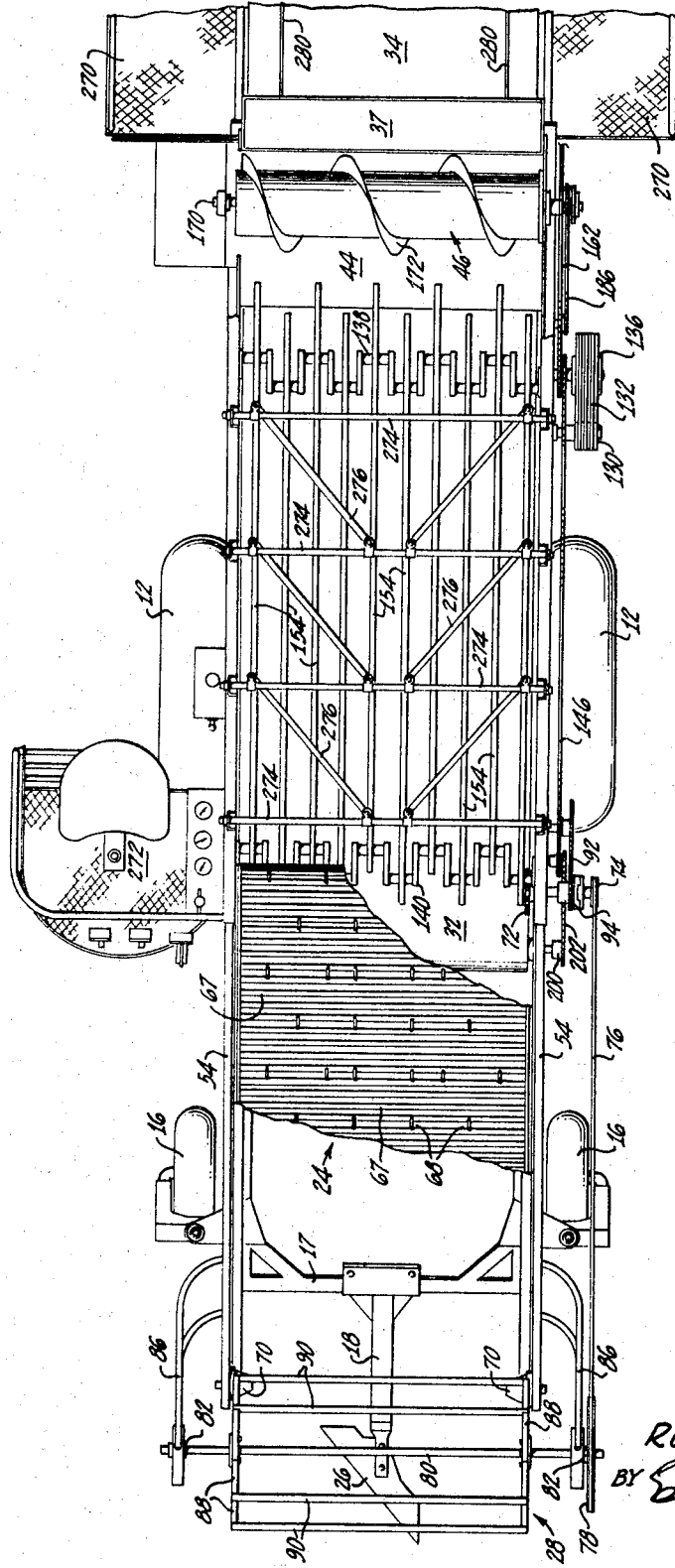
FIGURE 3 is a plan view of that portion of the structure shown in FIGURE 2 with a portion of the structure broken away.

Referring now to the drawings (especially FIGURE 8) wherein like characters refer to like parts throughout, a self-propelled harvester having a chassis 10, drive wheels 12, an engine, not shown, and trailing steerable wheels 14 is also provided with gauge or guide wheels 16, which, as seen in FIGURES 8, 1 and 2 support and govern the position or attitude of framework 17 and boom 18. The framework is pivoted to the forward end 20 of the chassis 10 at point 22 and the ascending conveyor, generally 24. Knife blade 26, the structure of which is more clearly seen in FIGURE 3, is mounted on the leading end of the boom 18. The reel, generally 28 cooperates with the conveyor 24 to feed the cut plants to conveyor-shaker mechanism, generally 30, which is similar in structure and function to the conventional "straw-walker." The tomatoes dropped between the ribs of the conveyor separator 30 are caught by endless belt conveyor 32 together with leaves, dirt, stones, etc. which are subsequently discharged onto endless conveyor belt 34. Conveyor belt 32 is preferably perforated so that some of the soil, stones, etc. may pass therethrough. As the tomatoes with the remaining dirt and debris fall from conveyor 32 to conveyor 34, a blast of air is applied via blower 36 through nozzle 37 which will drive anything of smaller diameter than the fruit past horizontal bar 38. The leaves, dirt, etc. fall onto conveyor belt 40 from whence they are discharged forwardly. The tomatoes meanwhile move toward the rear of the machine on endless belt conveyor 34, the culls being segregated manually while they are in transit. The remaining tomatoes are discharged from conveyor 34 onto the ascending conveyor, generally 42, at the uppermost end of which is mounted a discharge nozzle 43 from whence the tomatoes pass into a suitable receptacle. The plant portions remaining on conveyor 30 after separation of the fruit are advanced into the trough 44 and are discharged to one side of the machine by the action of vine auger 46.

The manner in which power is supplied to each of the aforementioned moving parts will be set forth in greater detail below. As seen in FIGURES 1 and 2, the depth of the knife 26 will be determined by the position of the wheels 16 which ride in furrows. The guide wheels 16 are pivotally mounted on frame 17 by means of arcuate brackets 50. Hydraulic cylinders 52 are mounted at the trailing ends of the frame 17 and are secured to the chassis of the vehicle at the other end thereof providing means for raising or lowering the knife 26 and conveyor 24. The side plates 54 of the conveyor have integral therewith triangular sections 56. The space between each opposed pair of these is bridged by a steel rod 58. The rods support wheels 59 which support the underside of conveyor 24. Upright support 60 secured to the uppermost portion of the guide wheel support has slidably mounted at the uppermost end thereof a cam or roller 62 which rides in the track 64 mounted beneath the lowermost edge of triangular frame element 56. This permits adjustment of the angle of incline of the ascending conveyor 24 relative to the boom 18. The conveyor 24 is basically a "potato chain" of a type which is available commercially and incorporates spaced bars 67 interlinked at their ends, each bar being sufficiently long to bridge the distance between the frame members 54. Secured to various of these bars are the arcuate tines 68 which are angled slightly away from the direction of movement of the conveyor so that separation of the vines or plants from the tines at the top of the conveyor cycle will be facilitated. At the lowermost end of the conveyor, the chain rides about truncated cones 70 (see FIGURE 3) which are rotatably mounted on plates 54. The potato chain is driven by sprockets 72 which is shown schematically in FIGURE 8 and in plan view in FIGURE 3. Pulley 74 is keyed to the shaft to which are also keyed spaced sprockets 72. The V-belt 76 is reeved about the pulley 74 and at the other end about the large pulley 78 which is keyed to shaft 80 journalled in the bearings 82 in turn supported by the plates 84 and mounting brackets 86 which are welded to the side plates 54 of the ascending conveyor frame. Spokes 88 are secured to shaft 80, the distance between each opposed pair being by horizontal rods 90 which direct the severed plants toward conveyor 24.

Chain 92 is trained about sprocket 94, idler 96 and sprocket 98 which is keyed to shaft 100. Mounted co-axially on shaft 100 immediately behind sprocket 98 is a second smaller sprocket 102 best shown schematically in FIGURE 8. The shaft immediately therebelow, shaft 104 which, like shaft 100, is journalled in the frame, has also keyed thereto a pair of sprockets 106 and 108, the smaller being foremost. Endless link chain 110 is trained about sprocket 102, idler 112 and sprocket 108. The relatively smaller sprocket 106 has trained thereabout endless link chain 114 which is also trained about the sprocket 116 keyed to the axle of the wheel 12.

Power is also provided through shaft 122 from a vehicle engine which drives the axle of wheel 12. Sprocket 120 is keyed to the shaft 122; trained about this sprocket and about sprocket 126 keyed to shaft 128 is endless link chain 124. Keyed co-axially with sprocket 126 is pulley 130 about which is reeved V-belt assembly 132 which passes along one side of adjustable tension applying idler 134 and about driven pulley 136. The pulley is keyed to crank shaft 138. The crank shaft is journalled in either side of the frame of the structure while spaced therefrom is a second crank shaft 140 also journalled in the side walls of the harvester. Sprocket 142 is keyed to the crank shaft 140. Crank shaft 138 has a corresponding sprocket 144 keyed thereto and endless link chain 146 passes about each of the last mentioned sprockets and contacts the various idlers 148, 150 and 152, the last two of which are mounted for adjustment so as to apply such tension to the chain 146 as may be desired. The space between the crank shafts is bridged by a series of parallel ribs 154 having "escalloped" upper surfaces, the crank shafts being mounted for rotation relative thereto by means of bearings, not shown, so that when the chain 146 is driven in the direction shown in FIGURE 8, half of the ribs 154 will be moving upwardly and rearwardly while the other half will be moving downwardly and forwardly, thus tending to advance the vines or stem portion of the plants toward trough 44. This structure (a "straw-walker") has been described elsewhere and hence will not be further detailed here.

A second sprocket 160 is also keyed to the shaft 138 about which is trained endless link chain 162 which, in turn, passes about idler 164, sprocket 166 and about sprocket 168 keyed to shaft 170 which is journalled in either side of the harvester. Mounted concentrically about shaft 170 is the vine auger 45 which consists of a steel cylinder having mounted thereabout a steel helix 172. The vine auger is also a conventional structure and will not be further described here. Idler 176 and shaft 178, both mounted on the frame, the latter having a sprocket 180 keyed thereto, have endless link chain 182 trained thereabout, providing power for blower 36 from sprocket 183 keyed to the shaft supporting sprocket 166. The nozzle 37 of the blower is so positioned that air will be forced between the two conveyors 32 and 34 in a direction opposite to the direction in which tomatoes move. The blower is directed between the discharge point of conveyor 32 and the adjacent loading point of conveyor 34, these two being horizontally spaced from one another. The blower forces dirt, small pebbles, leaves, etc. through the opening blocked, in part, by rod 38 as seen in FIGURES 4 and 8. The rod 38 is to prevent loss of fruit and is so proportioned and positioned that the space between the rod and each conveyor roller is less than the diameter of the fruit. The passage of debris to conveyor 40 is essentially unimpeded. Also, because the blower is oriented directly contrary to the direction of movement of the fruit on conveyor 34, the overall spacing of fruit on the conveyor is not adversely affected nor is dirt and debris accumulated at one side of the conveyor, as is the case with the conventional arrangement where a blower is mounted with its nozzle at one side of a conveyor carrying fruit. Chain 162 turns sprocket 168 also which rotates vine auger 46, thus providing for the removal of larger portions of the plant freed of the fruit by the action of the "straw-walker" 30 and advanced to trough 44. Keyed to shaft 170 directly behind sprocket 168 is a smaller sprocket 185, about which chain 186 is trained. The chain also contacts one side of sprocket 188 and passes about idler 190. The shaft 192 to which the sprocket 188 is keyed supports a pair of spaced rollers about which are trained the tomato belt 32 consisting of a series of rods extending transversely of the harvester which are linked together in the fashion of the aforementioned potato chains. These rods may conveniently be spaced a distance of about three-quarters of an inch and have perhaps one-sixteenth inch of rubber tubing thereabout, the latter preventing bruising of the fruit. The rubber tubing is needed since the tomatoes, after being freed from the vines by the action of the "straw-walker" 30 fall until they are caught by the conveyor 32. The tomatoes are then advanced to the discharge end of the conveyor adjacent the sprocket 188 at which time they fall directly to the conveyor 34 and are struck by a blast of air supplied by the blower so as to remove dirt, leaves, etc. Roller 194 at the far end of the conveyor belt 32 is journalled in the frame of the harvester. Dirt, pebbles, etc. which pass through the spaces between the rods making up conveyor belt 32 and which are driven by the blower 46 past the rod 38 find their way to conveyor belt 40 which is a conventional "dirt draper" and formed of canvas which may be reinforced with transverse rods or sticks. This conveyor belt is supported by rollers in turn driven by sprocket 200 driven by endless link chain 202 trained about idler 204 and sprocket 206 keyed to the crank shaft 140. The other end of the conveyor belt is supported by roller 201.

Trained about another sprocket keyed to the shaft 128 is the link chain 210 which is trained about sprocket 212 keyed to a shaft passing into a gear box 214. The drive shaft 216 conveys power to gear box 218 and power is provided to the shaft 220 having keyed thereto sprocket 222. Endless link chain 224 is reeved thereabout and about sprocket 226 which drives the roller 227 supporting conveyor belt 34. The belt 34 is supported in its opposite end by roller 228.

Shaft 230 of gear box 218 has keyed thereto sprocket 232 which in turn drives endless link chain 234 and sprocket 236. Co-axially mounted is sprocket 238 about which is trained endless link chain 240 which drives sprocket 242. Mounted co-axially therewith is the sprocket, not shown, which drives conveyor 244 having vertical side plates 245. This conveyor is another "potato chain" consisting of spaced interlinked parallel rods, as best seen in FIGURE 5, which are preferably no greater than three-quarters of an inch apart. The conveyor is held down in the area of sprocket 238 by guide plates 246 and is supported by roller 247 at one end thereof. One end of the conveyor may be raised and lowered by use of hydraulic cylinder 250 and there is provided at the uppermost end thereof the discharge nozzle, generally 43, having suitable supporting brackets 254 mounted on either side of the conveyor framework. The nozzle has a lower canvas section 254 which surrounds frame 255. Rubber straps 256 extend transversely thereof whereby to provide means for slowing the descent of the fruit and so to minimize bruising. V-shaped member 258 is secured to brackets 253 by means of rod 264. This provides considerable flexibility for the downwardly depending portion of the nozzle. Centering rod 266 hooks beneath cross member 268 (FIGURE 6) and provides additional stability for the entire nozzle structure.

As may be seen in FIGURES 3, 4 and 5, the unit is provided with running boards 270 in the area adjacent the conveyor belt 34 so that workers may ride thereon and remove culls as the tomatoes are advanced to the conveyor unit 42.

In the preferred embodiment the vehicle is self-propelled and a place for the operator together with controls is provided generally in the area designated 272.

Another preferred feature is means of some variety for spreading the vines as they are transported by "strawwalker" conveyor 30. Devices have been constructed for use in similar circumstances, utilizing downwardly depending rubber curtains which, in pairs, form V's and tend to spread the vines as they are moved toward the trough 44. These may all be supported by the frame members 274 which are seen in FIGURES 1, 2 and 3, the V-shape of the curtains 276 being seen in FIGURE 3.

To facilitate the separation of culls from other tomatoes on conveyor 34 by persons standing on side platforms 270, there is provided a pair of rails 280 having braces 282. The rails are spaced inwardly from the longitudinal edges of belt 34. At the discharge end of belt 34, vertical conduits 284 are provided into which the culls are advanced by the action of conveyor 34. The culls are thus returned to the ground at points adjacent the recently cut vine row.

From the foregoing, it will be seen that a harvester has been provided which is effective for cutting, gathering and stripping comestibles from plants wherein the plants must be cut close to the ground or beneath the surface thereof whereby to cause substantial quantities of leaves, stems and possibly dirt to be carried into the mechanism, thus necessitating an effective manner of separating the unwanted dirt and other debris from the comestibles. The arrangement described above is unusually effective wherein the initially used conveyors are mesh or spaced rods and where the comestible, freed of most of the plant, soil, etc. is struck by a properly directed blast of air which will cause any remaining soil or leaves to be blown off of the conveyor supporting the comestibles.

Obviously many modifications and variations of this invention may be made without departing from the spirit and scope hereof, and therefore only such limitations should be imposed as are indicated in the appended claims.

I claim:

1. In a tomato harvester of the type having a knife for severing tomato bearing plants from a ground surface, a conveyor for transporting the severed plants upwardly and rearwardly from said knife, and plant processing apparatus having an inlet end disposed in plant receiving relation to said conveyor, the improvement comprising a plurality of plant engaging members secured to said conveyor and projecting therefrom, said members having a forward plant engaging surface of arcuate configuration oriented convexly forward, said members each having a first end fixedly secured to the conveyor and extending generally perpendicularly therefrom, said members each having a second end spaced outwardly and rearwardly of said first end and constituting the sole projections from said conveyor so that a medial portion of said members contacts the plants before said second end and so that plants are discharged from said conveyor prior to advancement of said second ends past the inlet end of said plant processing apparatus.

2. In a harvester for tomato bearing plants of the type having a knife for severing plants growing from a surface and means for separating the comestibles from the plants, which separating means has an inlet end above and rearwardly of said knife; improved apparatus for carrying severed plants from the knife to the inlet end of said separating means comprising: an endless conveyor, means for driving the conveyor along a path having an upper conveying reach sloping rearwardly upwardly from said knife to said inlet end, a lower return reach, a first arcuate portion adjacent said knife and extending between the conveying reach and the return reach, and a second arcuate portion adjacent to said inlet end and extending between the conveying reach and the return reach; and a plurality of plant engaging members fixedly secured to said endless conveyor and projecting therefrom, said members having a forwardly convex plant engaging surface, so that in traversing said first arcuate portion a medial segment of said members contacts the plants before the free end of said members, said plant engaging members constituting the sole projections from said conveyor in its traverse of said first arcuate portion.

References Cited

UNITED STATES PATENTS 3,199,604   8/1965   Lorenzen et al.   171—27
2,038,809   4/1936   Tallman et al.   56—345

ANTONIO F. GUIDA, *Primary Examiner.*

U.S. Cl. X.R.

56—327; 171—62